(12) United States Patent
Mantkowski

(10) Patent No.: US 7,739,794 B2
(45) Date of Patent: Jun. 22, 2010

(54) METHOD FOR REPAIR OF RAIL WHEELS

(75) Inventor: Thomas Edward Mantkowski, Madeira, OH (US)

(73) Assignee: General Electric Company, Schenectady, NY (US)

( * ) Notice: Subject to any disclaimer, the term of this patent is extended or adjusted under 35 U.S.C. 154(b) by 144 days.

(21) Appl. No.: 12/040,005

(22) Filed: Feb. 29, 2008

(65) Prior Publication Data

US 2009/0218837 A1 Sep. 3, 2009

(51) Int. Cl.
*B21H 1/08* (2006.01)
*B23P 6/00* (2006.01)
*B23P 11/00* (2006.01)
*B23P 13/00* (2006.01)
*B23P 17/00* (2006.01)
*B60B 17/00* (2006.01)

(52) U.S. Cl. .............. 29/894.01; 29/894.011; 29/402.04; 29/402.05; 29/402.06; 29/402.07; 29/402.09; 29/402.11; 29/402.13; 29/402.16; 29/407.05; 29/447; 29/458; 29/525.14; 295/1

(58) Field of Classification Search .............. 29/894.01, 29/894.011, 402.04, 402.05, 402.06, 402.07, 29/402.09, 402.11, 402.13, 402.16, 402.18, 29/407.01, 407.05, 447, 525.14; 228/194; 295/1, 30

See application file for complete search history.

(56) References Cited

U.S. PATENT DOCUMENTS

| 351,431 | A | * | 10/1886 | Fowler | 295/27 |
| 969,275 | A | * | 9/1910 | Hansen | 29/894.01 |
| 3,229,361 | A | * | 1/1966 | Valacich | 228/119 |
| 6,073,346 | A | * | 6/2000 | Runkle | 29/894.01 |
| 6,093,092 | A | * | 7/2000 | Ramanath et al. | 451/541 |
| 6,746,064 | B1 | * | 6/2004 | Petrek et al. | 295/1 |

FOREIGN PATENT DOCUMENTS

JP 08103856 A * 4/1996

* cited by examiner

*Primary Examiner*—Jermie E Cozart
(74) *Attorney, Agent, or Firm*—GE Global Patent Operation; John A. Kramer

(57) ABSTRACT

A method includes shrink fitting a ring member about a railroad wheel body and metallurgically bonding the ring member to the railroad wheel body. A wheel assembly includes an inner portion obtained from a worn railroad wheel, a ring member disposed about the inner portion, and suitable electroplating material disposed on at least one of the faying surfaces. The wheel assembly may be heated under suitable conditions to provide diffusion bonding across interfacing faying surfaces to produce an integral wheel structure. Appropriate quenching, tempering, and finishing processes may be utilized to obtain desired properties. An article formed thereby includes an inner body portion obtained from a worn railroad wheel and a metallurgically bonded outer circumferential portion. The outer portion may comprise a composition selected for desired wear characteristics.

14 Claims, 3 Drawing Sheets

US 7,739,794 B2

METHOD FOR REPAIR OF RAIL WHEELS

BACKGROUND OF THE INVENTION

This invention relates generally to a railroad wheels, and more specifically to a method to repair worn railroad wheels to enable them to be returned to service.

During service, railroad wheels wear away, as they are designed to be sacrificial relative to the railroad tracks. Additionally, wheels can be removed for other defects such as spalling, shelling, and out-of-roundness.

When a wheel is removed from service for tread defects, it may be re-machined to adjust its profile relative to the rail geometry, provided that there is sufficient rim metal remaining. Presently, the most common reason that wheels are discarded is because of wearing to a minimum dimension.

Weld build-up or fusion welding of a new ring to the wheel hub is prohibitive because of tight quality standards imposed on rail wheels by the Association of American Railroads (AAR). Currently there are no good repair techniques for rail wheels due to restrictions on inclusions or cracks that would generally result from traditional welding techniques.

One non-welding approach taken to address the wear problem has been to shrink fit a new steel ring onto the wheel hub using thermal expansion techniques. However, a disadvantage to this approach is that the ring or "tire" is under tension in service, and as it wears thinner it becomes highly vulnerable to cracking.

Wheels are a high-cost item for rail operators. Accordingly it would be desirable to have a repair method for extending the service life of worn railroad wheels that also meets stringent safety requirements.

BRIEF DESCRIPTION OF THE INVENTION

The above-mentioned need or needs may be met by exemplary embodiments that provide methods for repairing rail wheels resulting in a metallurgical bond between faying surfaces.

An exemplary embodiment provides a method including disposing a ring member having an inner faying surface about a railroad wheel body having an outer faying surface to form a wheel assembly. The method includes metallurically bonding the ring member to the railroad wheel body at the inner and outer faying surfaces to provide an integral wheel structure.

Another exemplary embodiment provides a method including providing an inner faying surface on a ring member, providing an outer faying surface on a railroad wheel body, and shirk fitting the ring member to the railroad wheel body under suitable conditions so that the inner and outer faying surfaces are brought into intimate contact, and metallurically bonding the ring member to the wheel body under suitable bonding conditions to form an integral wheel structure.

Another exemplary embodiment provides an article including an integral wheel structure comprising an inner wheel body portion obtained from a worn railroad wheel and an outer portion circumferentially disposed about the inner wheel portion and being metallurically bonded thereto.

Another exemplary embodiment provides an assembly including an inner wheel body portion obtained from a worn railroad wheel and including an outer faying surface, a ring member disposed about the inner wheel body portion and including an inner faying surface, and an electroplated material disposed on at least one of the outer or inner faying surfaces.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
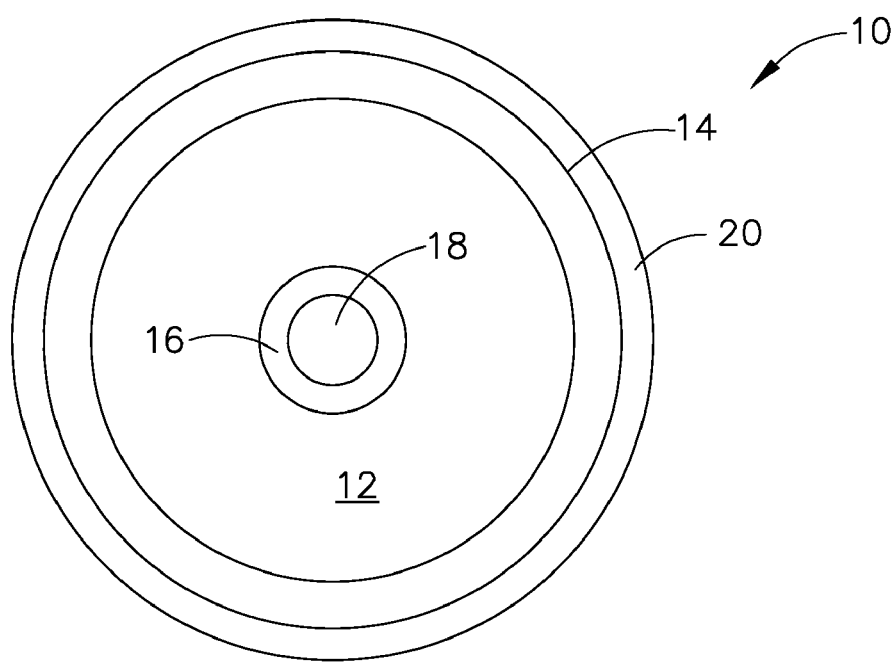
FIG. 1 is a schematic representation of an exemplary railroad wheel.

Referring to the drawings wherein identical reference numerals denote the same elements throughout the various views, FIG. 1 illustrates an exemplary railroad wheel 10 including a body 12 with a rim 14 extending about the circumference of the body. The body 12 has a hub 16 having a bore 18 therethrough for receiving an axle. In use, wheels are secured to opposing ends of an axle with the wheels spaced to rotatably contact parallel railroad tracks. A flange 20 extends radially outward from the rim for retaining the wheels on the railroad tracks. Railroad wheel 10 represents a wheel that has been used in service, and which exhibits wear or other defect(s).

As used herein, "wheel body" refers to that portion of railroad wheel 10 that is utilized in an exemplary repair process.

As used herein, "faying surface" means that surface of a member which is in contact with, or in close proximity to, another member to which it is to be joined.

As used herein, "diffusion bonding" refers to a solid-state welding process that produces coalescence of faying surfaces by application of pressure and elevated temperatures. The process does not involve melting of the relative parts.

As used herein, "shrink fitting" refers to a technique in which pieces of a structure are heated or cooled, employing the phenomenon of thermal expansion, to make a non-metallurgical joint.

As used herein, "induction heating" refers to a process of heating a metal object by electromagnetic induction.

As used herein, "quenching" refers to a quick cooling technique in which metal is rapidly cooled from high temperatures, usually in oil or water, in order to provide the formation of desirable phases and increase the hardness level of the steel.

As used herein, "tempering" refers to a process whereby quenched steel is reheated to a temperature below the eutectoid temperature, then cooled in a controlled fashion in order to increase ductility and toughness and to ensure dimensional stability.

As used herein, "metallurgically clean" means a surface free of stable oxides which is thus suitable for forming metallurgical bonds by processes such as electroplating or diffusion bonding.

All percentages provided herein are percent by weight, unless otherwise noted.

Figure 2:
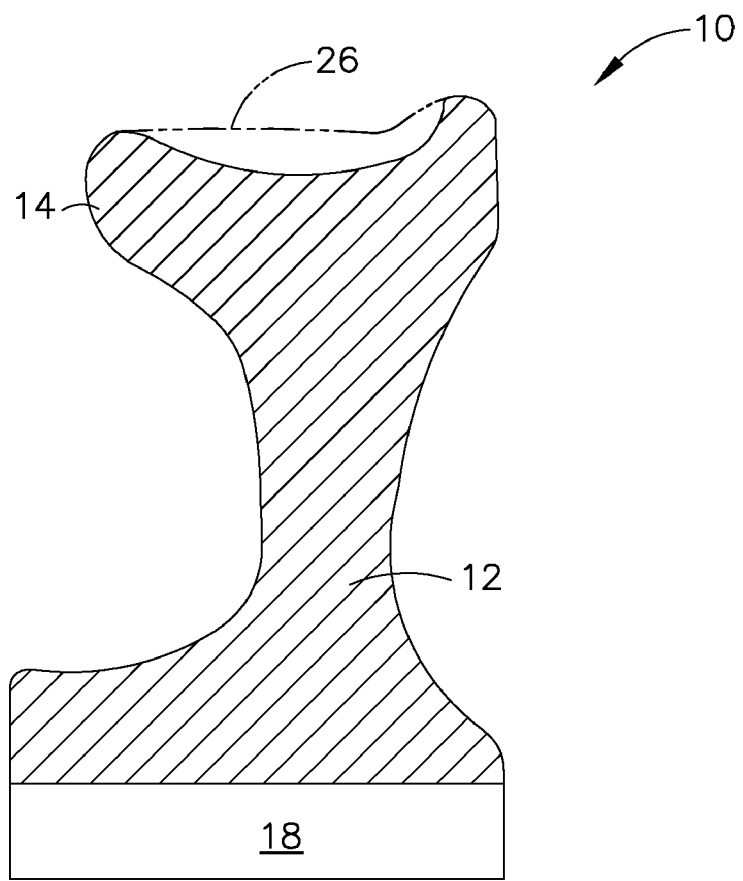
FIG. 2 is a cross-sectional view of a worn railroad wheel exhibiting a defect.

The worn wheel 10 may exhibit defects such as thin tread, spalling, out of roundness, high flange, or any other defect that may be corrected using the processes described herein. However, solely for exemplary purposes and not by way of limitation, FIG. 2 depicts a worn wheel 10 as having a thin rim 14. For reference, a profile 26 of an unworn wheel rim is illustrated in phantom.

As illustrated, the worn wheel 10 does not provide sufficient material at the rim to allow a re-profiling operation. A worn wheel in such condition would therefore be condemned. Exemplary methods disclosed herein provide means for enabling restoration of a condemnable wheel for a return to service.

Figure 3:
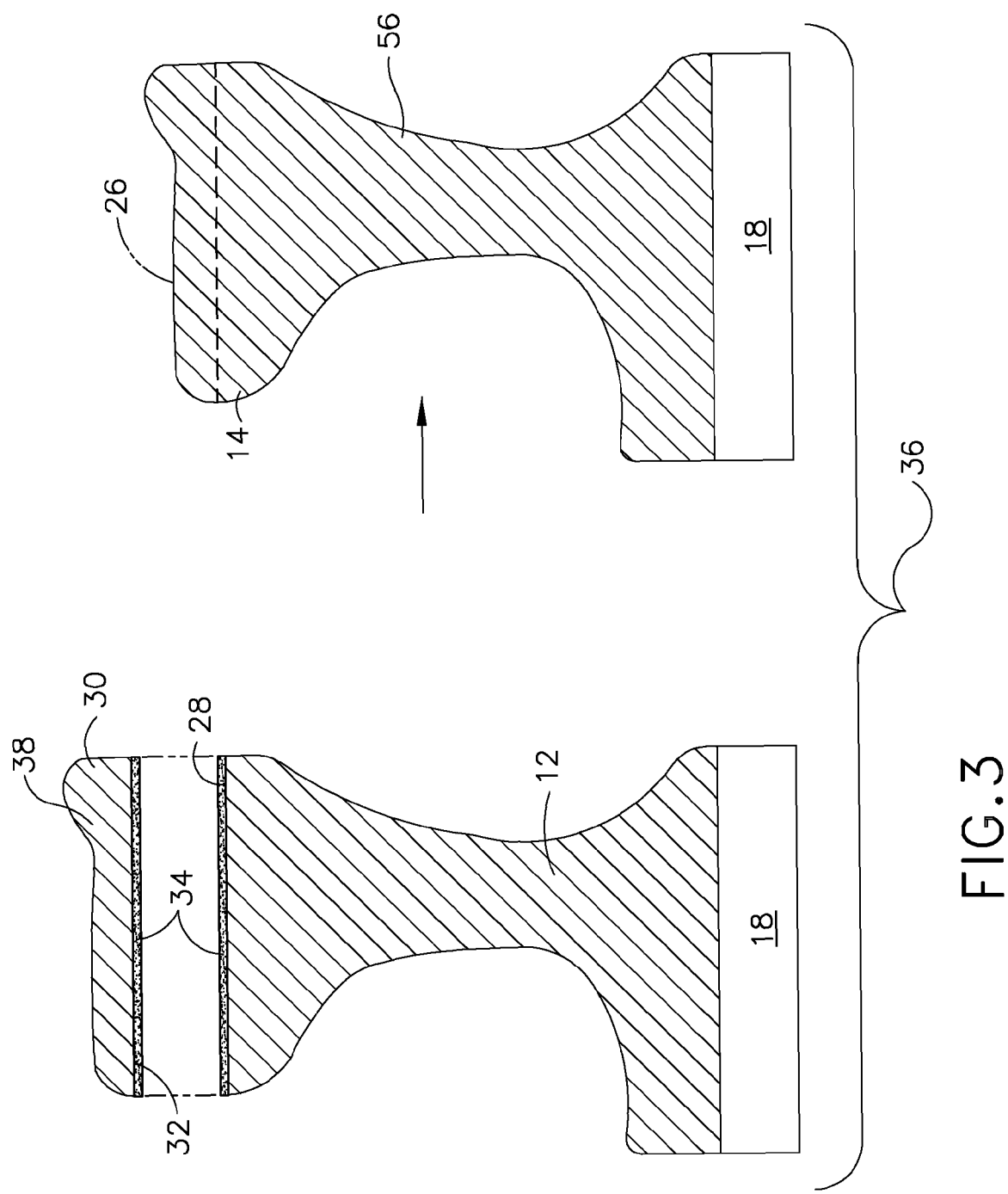
FIG. 3 is a schematic representation showing an exploded view of an exemplary wheel assembly and a resulting integral wheel structure.

As shown in FIG. 3, in an exemplary embodiment, the worn wheel is machined at the tread and flange regions a sufficient amount to remove the defect and to provide a wheel body 12 having a substantially cylindrical outer faying surface 28.

In an exemplary embodiment, a ring member 30 is utilized with the wheel body 12 to provide additional structural material at the circumference of the wheel body. In an exemplary embodiment, the ring member 30 is machined to provide an inner faying surface 32 adapted for a close fit with outer faying surface 28.

In an exemplary embodiment, one or both of the faying surfaces 28, 32 are plated with an electroplated material 34. The electroplated material 34 may be useful to deter oxidation of the faying surface(s). The faying surfaces 28, 32 may also be cleaned, brushed, or otherwise prepared for bonding.

In an exemplary embodiment, ring member 30 is disposed about the wheel body 12 to form a wheel assembly 36. In general terms, wheel assembly 36 undergoes subsequent treatment in order to form a metallurgical diffusion bond between ring member 30 and wheel body 12, and the integral wheel structure is further processed prior to returning to service.

An exemplary ring member 30 is formed of steel having a composition compatible with the steel of wheel body 12. It is contemplated that wheel body 12 may have been from a forged- or cast-steel wheel. An exemplary ring member 30 may be provided with a flange 38 to approximate a final wheel profile as will be explained in greater detail below. Some exemplary steel compositions are those compositions for wheels mandated by the AAR, and listed in AAR M-107/208. For example, a Class 'C' wheel would have 0.67-0.77% C, 0.60-0.90% Mn, 0.030% max P, 0.005-0.040% S, and 0.15-1.00% Si.

It is contemplated within the scope of this disclosure that the rim build up may be provided by a ring member having a different composition than the wheel body. The composition of the ring member may be selected to provide improved wear resistance. Some exemplary alloys able to provide improved wear resistance as compared to the wear resistance of the wheel body are suggested in U.S. Pat. No. 6,073,346. Suggested alloys include high speed tool steels, such as AISI M4 steel (composition of 1.3% C, 0.30% Mn, 0.30% Si, 4.00% Cr, 4.00% V, 5.50% W and 4.50% Mo), AISI T15 steel, 300 series stainless steel or nickel alloy matrix steels, PH series stainless steels, ferretic stainless steels, crucible CPM 9 V, 10 V and 15 V vanadium carbide containing tool steels, D2 type chromium carbide containing tool steels, and CARPENTER AERMET 100. Thus, the wear and traction properties of the tread and flange could be optimized without reducing the strength and life of the wheel body.

Figure 4:
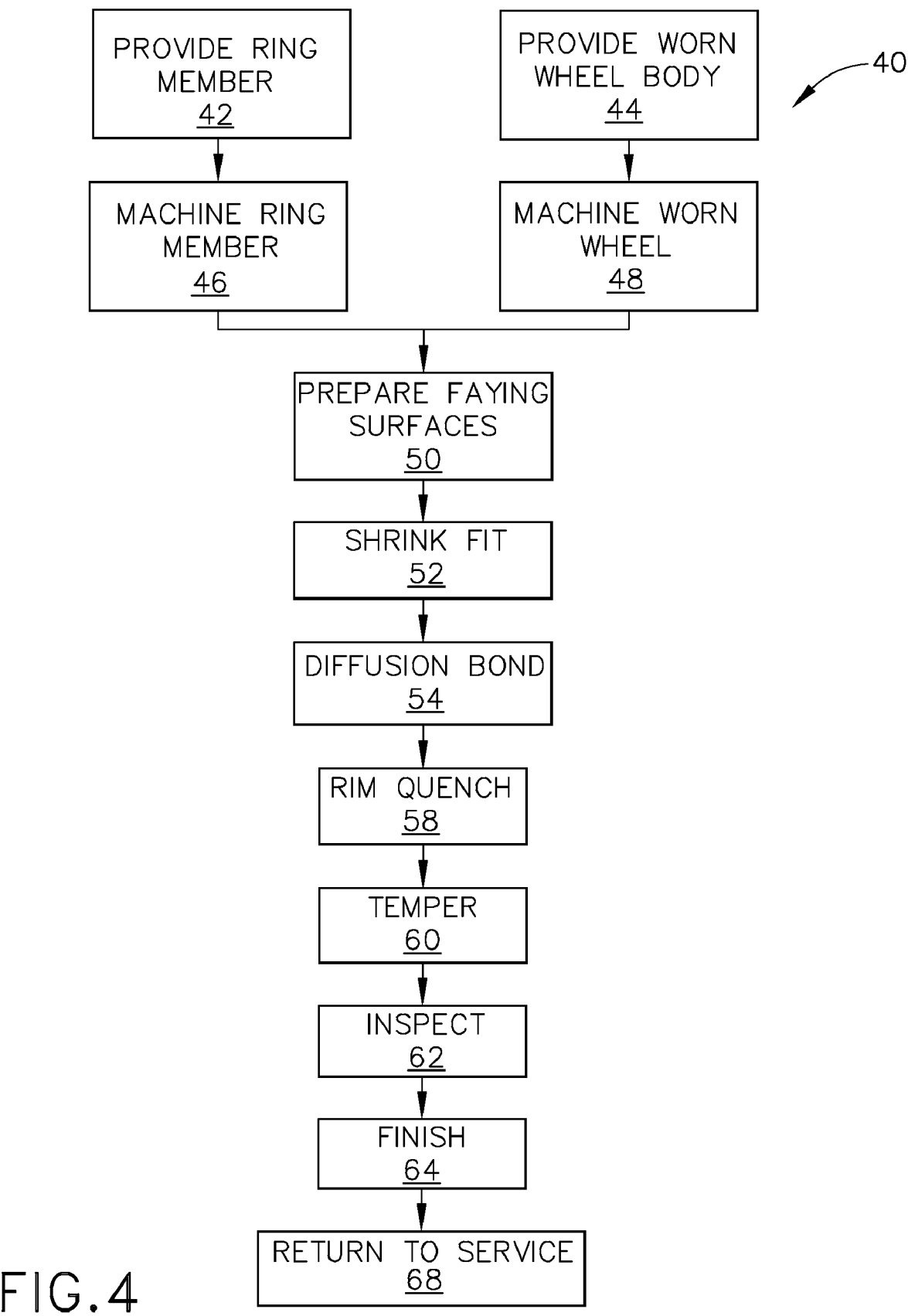
FIG. 4 is a flowchart of an exemplary wheel repair process.

With reference to FIG. 4, an exemplary process 40 includes: providing a ring member 30 (Step 42); providing a worn wheel 10 (Step 44); machining the ring member 30 to provide inner faying surface 32 (Step 46); and machining the worn wheel 10 to provide wheel body 12 and outer faying surface 28 (Step 48). The faying surfaces 28, 32 are prepared for bonding (Step 50).

During machining of the worn wheel 10, sufficient material is removed from about the wheel circumference to remove the flange and at least a portion of the rim and provide an outer diameter of wheel body 12. Machining step 48 removes oxidation and other surface impurities. The machining step is utilized to address defects such as insufficient rim depth, worn flange profile, out of roundness, and others as will be appreciated by those of skill in the art.

The ring member 24 is machined to the extent necessary to provide an inner diameter able to mate with the outer diameter of wheel body 12. The ring member must be able to provide sufficient material to be joined to wheel body at the rim and flange regions.

In an exemplary process, metallurgically clean faying surfaces could be prepared for bonding by electroplating one or both surfaces 28, 32. In an exemplary embodiment, the faying surfaces 28, 32 can be plated to prevent surface oxidation, and to provide a diffusion couple and active interface for bonding. In an exemplary embodiment, an inexpensive metal, such as nickel or chromium may be used, or a diffusion couple could be created by plating one faying surface with nickel, and the other faying surface with copper. Alternately, a noble metal such as gold, platinum or palladium can be utilized. The plating can be carried out using brush plating (also known as selective plating) or by immersion plating. The plating could be a thin flash coat about 0.5 micron thick aimed at keeping the surfaces clean, or a heavier deposit of 1-5 microns aimed at producing better mobility of the faying surfaces and increasing the diffusion rate earlier in the heating cycle. Other plating and surface preparation techniques may be employed by those having skill in the art.

In an exemplary embodiment, the inner faying surface 32 of ring member 30 is brought into close physical contact with the outer faying surface 28 of the wheel body 12 in a shrink-fitting operation (Step 52) to form the wheel assembly 36. An exemplary shrink-fitting operation includes induction heating of the ring member as is known in the art. In an exemplary embodiment, the shrink-fitting operation occurs in an argon atmosphere.

In an exemplary embodiment, wheel assembly 36 is heated to a predetermined temperature for sufficient time so that diffusion bonding occurs between the faying surfaces 28, 32 (Step 54). In an exemplary embodiment, the tension of the ring member 30 against the wheel body 12 from the shrink fit operation provides sufficient pressure for the diffusion bonding to occur. In other exemplary methods, the wheel assembly 30 may be subjected to additional pressurizing means.

In an exemplary embodiment, during the diffusion bonding step, the wheel assembly 36 is heated to a normalizing temperature in an argon atmosphere or in air so that a desired microstructure grows across the boundary between the wheel body 12 and ring member 30. In an exemplary embodiment, the wheel assembly 30 is heated to about 2050° F. (about 1121° C.) for about 4 hours to provide sufficient diffusion bonding. It is anticipated that other bonding conditions would provide suitable grain growth across the boundary. In an exemplary embodiment, the bonding temperatures range from about 1650° F. to about 2300° F. (about 899° C.-1260° C.), for sufficient time at temperature to bond the ring member 30 to the wheel body 12. For example, the time at temperature may be from about 1 to about 6 hours, although extended bonding time may be desired.

As illustrated in FIG. 3, as the diffusion bonding takes place, the ring member 30 and wheel body 12 become an integral wheel structure 56 and the tension from the shrink-fit is stress-relieved out of the part.

Referring again to FIG. 4, in an exemplary embodiment, following the diffusion bonding step, the integral wheel structure 56 is subjected to one or more processes before being returned to service. For example, the integral wheel structure 56 may be subjected to rim quenching (Step 58), tempering (Step 60), inspection (Step 62) and finishing (Step 64) before returning to service (Step 68).

In an exemplary embodiment, the rim quenching step includes spraying the outer tread area of the wheel assembly with water while the wheel is rotated. The rim-quenching step promotes desirable microstructure for hardening the steel, and introduces a residual compressive stress in the tread area which greatly improves the tread's fatigue strength.

In an exemplary embodiment, the tempering step includes reheating the rim-quenched wheel to approximately 800-900° F. (426-482° C.) for approximately one hour to improve the toughness of the tread area, and to yield a Brinnell hardness in the ranges required by AAR M107/208 (i.e.: HBN of 321-363 for a Class C wheel).

In an exemplary embodiment, the inspection step includes a hardness check, an ultrasonic inspection for internal defects, and a dimensional check, all for conformance to the AAR specification.

In an exemplary embodiment, the finishing step may include machining the integral wheel structure 56 to provide a radial flange with an acceptable profile. If the ring member 30 included a flange 38, the finishing step may include shaping the flange and the flange/rim interface. If ring member 30 was not flanged prior to bonding, then the finishing step may include providing a radial flange by removing sufficient material from a circumferential surface of the integral wheel structure 56 and shaping the flange and flange/rim interface. As a final processing step, the wheel may be shot peened to 8C intensity in accordance with AAR M107/208, and then marked with the appropriate legends.

Thus, exemplary embodiments disclosed herein provide methods for repairing and restoring worn railroad wheels. The exemplary methods utilize diffusion bonding techniques to provide a restored wheel able to meet structural and safety requirements including applicable AAR standards while avoiding disallowed techniques such as fusing welding.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   a) disposing a ring member having an inner faying surface about a railroad wheel body having an outer faying surface to form a wheel assembly;
   b) metallurically bonding the ring member to the railroad wheel body at the inner and outer faying surfaces to provide an integral wheel structure.

2. The method according to claim 1 wherein (a) includes shrink fitting the ring member to the wheel body.

3. The method according to claim 1 wherein (b) includes heating the wheel assembly under suitable conditions for a sufficient time to provide diffusion bonding across an interface between the inner and outer faying surfaces.

4. The method according to claim 3 wherein during at least a part of (b), only a tension exerted between the ring member and the railroad wheel body from shrink fitting in (a) is utilized as a bonding pressure.

5. The method according to claim 1 further comprising:
   (c) subjecting the integral wheel structure to at least one subsequent processing step selected from quenching, tempering, inspecting, and finishing.

6. The method according to claim 1 further comprising:
   prior to (a), providing the ring member, wherein the ring member includes at least one outwardly extending radial flange.

7. The method according to claim 1 further comprising:
   prior to (a), machining the ring member to provide the inner faying surface.

8. The method according to claim 1 further comprising:
   prior to (a), machining the railroad wheel body to provide the outer faying surface.

9. The method according to claim 1 further comprising:
   prior to (a), applying a plating material to at least one of the inner faying surface and the outer faying surface.

10. The method according to claim 1 further comprising:
    prior to (a), applying a first plating material to the inner faying surface and applying a second plating material to the outer faying surface, wherein, during at least a part of (b), a diffusion couple is produced between the first and second plating materials.

11. A method comprising:
    a) providing an inner faying surface on a ring member;
    b) providing an outer faying surface on a railroad wheel body;
    c) shrink fitting the ring member to the railroad wheel body under suitable conditions so that the inner and outer faying surfaces are brought into intimate contact; and
    d) metallurically bonding the ring member to the wheel body under suitable bonding conditions to form an integral wheel structure.

12. The method according to claim 11 further including, prior to (b), providing a worn railroad wheel having at least one condemnable defect, and machining the worn railroad wheel to provide the wheel body, wherein the at least one condemnable defect is removed.

13. The method according to claim 11 further comprising:
    e) subjecting the integrated wheel structure to at least one subsequent process; and
    f) machining the integral wheel structure to a final wheel configuration.

14. The method according to claim 13 further comprising:
    g) comparing at least one property of the integral wheel structure with a predetermined standard; and
    h) placing the integral wheel structure into service.

* * * * *